United States Patent [19]

Langford

[11] Patent Number: 5,309,135
[45] Date of Patent: May 3, 1994

[54] FLEXIBLE POTENTIOMETER IN A HORN CONTROL SYSTEM

[76] Inventor: Gordon B. Langford, 11193 S. Star Cir., Sandy, Utah 84092

[21] Appl. No.: 60,346

[22] Filed: May 10, 1993

Related U.S. Application Data

[63] Continuation-in-part of Ser. No. 963,855, Oct. 20, 1992, which is a continuation of Ser. No. 552,575, Jul. 13, 1990, Pat. No. 5,157,372.

[51] Int. Cl.⁵ .................. H01C 3/06; H01C 13/00
[52] U.S. Cl. ................................ 338/211; 338/50
[58] Field of Search ............... 338/211, 2, 69, 210, 338/211, 154, 114, 50

[56] References Cited

U.S. PATENT DOCUMENTS

| | | |
|---|---|---|
| 3,541,491 | 11/1970 | Worster . |
| 3,895,288 | 7/1975 | Lampen et al. . |
| 3,968,467 | 7/1976 | Lampen et al. . |
| 4,268,815 | 5/1981 | Eventoff et al. . |
| 4,276,538 | 6/1981 | Eventoff et al. . |
| 4,314,227 | 2/1982 | Eventoff . |
| 4,314,228 | 2/1982 | Eventoff . |
| 4,315,238 | 2/1982 | Eventoff . |
| 4,355,692 | 10/1982 | Ostrelich . |
| 4,489,302 | 12/1984 | Eventoff . |
| 4,503,705 | 3/1985 | Polchaninoff . |
| 4,605,593 | 8/1986 | Iida . |
| 4,649,784 | 3/1987 | Fulks et al. . |
| 4,763,534 | 8/1988 | Hager . |
| 4,837,548 | 6/1989 | Lodini . |
| 4,876,419 | 10/1989 | Lodini . |
| 5,086,785 | 2/1992 | Gentile et al. . |
| 5,157,372 | 10/1992 | Langford . |

Primary Examiner—Marvin M. Lateef
Attorney, Agent, or Firm—Trask, Britt & Rossa

[57] ABSTRACT

A flexible potentiometer acts as a horn actuator in an automobile horn control system. In a preferred embodiment, the flexible potentiometer is adhered to a flexible substrate, which is in turn adhered to the inside surface of an airbag hub cover. The shape of the flexible potentiometer is chosen so that the automobile horn will sound when the driver presses against particular portions of the outside of the hub cover. The resistance of the flexible potentiometer changes as its shape changes as the user presses against the hub cover. A horn control circuit responds to extremely rapid changes in the resistance of the flexible potentiometer, but not to more gradual changes caused by, for example, temperature changes. Additional flexible potentiometers may be used to control other functions such as cruise control.

5 Claims, 8 Drawing Sheets

FLEXIBLE POTENTIOMETER IN A HORN CONTROL SYSTEM

RELATED APPLICATIONS

This is a continuation-in-part of U.S. patent application No. 07/963,855, filed Oct. 20, 1992, which is a continuation of U.S. patent application Ser. No. 07/552,575, filed Jul. 13, 1990, which issued as U.S. Pat. No. 5,157,372.

BACKGROUND OF THE INVENTION

1. Field

The present invention relates to a flexible potentiometer used as a horn actuator in an automobile horn control system.

2. State of the Art

In the 1980's, automobile manufacturers began putting air bags adjacent to steering wheel hubs. FIGS. 1 and 2 show side and front views of a typical air bag system 10. Referring to FIGS. 1 and 2, air bag system 10 includes an airbag 12 between a rigid steering wheel hub 16 and an airbag hub cover 20. Hub 16, which is connected to steering wheel shaft 24, supports steering wheel 26 through supports 32A, 32B, 32C, and 32D.

When the automobile has a sudden impact, a pressure capsule 36 releases a burst of high pressure air into airbag 12. Airbag 12 is inflated in response to the burst. Hub cover 20 splits along a partially perforated line 38 under the force of airbag 12.

Referring to FIG. 3, a typical automobile horn control system 40 includes a horn actuator 42, which may comprise a movable element 44 and a stationary element 46. When the movable element 44 is pressed against the stationary element 46, an electrical path is completed causing an electrical signal to appear on conductor 48 between stationary element 46 and a horn control circuit 52. When the signal appears on conductor 48, horn control circuit 52 activates a horn 56 through a voltage from a power supply 58.

Horn actuators, such as horn actuator 42, have been placed in a variety of positions on the steering wheel and under or on the steering wheel hub cover. However, it has been found safest to position the horn actuators on or under the hub cover so that the driver may activate the horn with the palm of his hand or lower part of the palm of his hand.

Manufacturers of airbag systems have placed membrane switch horn actuators between hub covers and airbags. Various problems, however, have been encountered in providing membrane switches that activate the horn in response to a force within a desired range. Membrane switches have the tendency to require too little or too much force to close.

SUMMARY OF THE INVENTION

A flexible potentiometer acts as a horn actuator in an automobile horn control system. In a preferred embodiment, the flexible potentiometer is adhered to a flexible substrate, which is in turn adhered to the inside surface of an airbag hub cover. The shape of the flexible potentiometer is chosen so that the automobile horn will sound when the driver presses against particular portions of the outside of the hub cover. The resistance of the flexible potentiometer changes as its shape changes as the user presses against the hub cover. A horn control circuit responds to extremely rapid changes in the resistance of the flexible potentiometer, but not to more gradual changes caused by, for example, temperature changes. Additional flexible potentiometers may be used to control functions of auxiliary electrical components, such as cruise control.

The function of the horn control circuit is to sound the horn when the driver presses against particular portions of hub cover with at least a threshold level of force. The resistance of the flexible potentiometer may change with changes in temperature. Therefore, a preferred horn control circuit responds to extremely rapid changes in the resistance of the flexible potentiometer, but not to more gradual changes.

The flexible potentiometer includes a variable resistance conductive material the resistance of which significantly changes as the conductive material is bent. The flexible potentiometer may also include a constant resistance conductive material applied on top of the conductive material. The resistance of the conductive material changes significantly as it is bent. The resistance of constant resistance conductive material remains relatively constant as it is bent. The constant resistance conductive material provides a path for electrical current which is in parallel to the path provided by conductive material. Therefore, the overall change in resistance of the flexible potentiometer is less if the constant resistance conductive material is applied. Constant resistance conductive material helps to linearize the resistance versus load curve of the flexible potentiometer.

DETAILED DESCRIPTION OF THE ILLUSTRATED EMBODIMENTS

Figure 1:
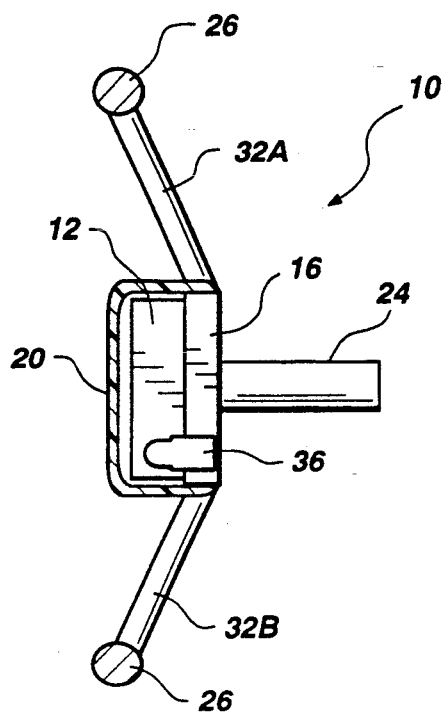
FIG. 1 is a side view of a typical prior art air bag system.
Figure 2:
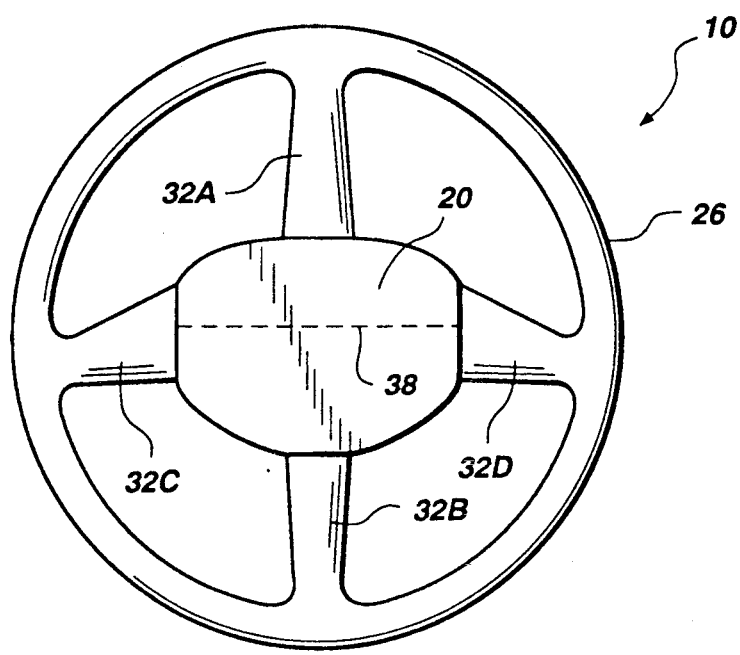
FIG. 2 is a front view of the typical prior art air bag system shown in FIG. 1.
Figure 3:
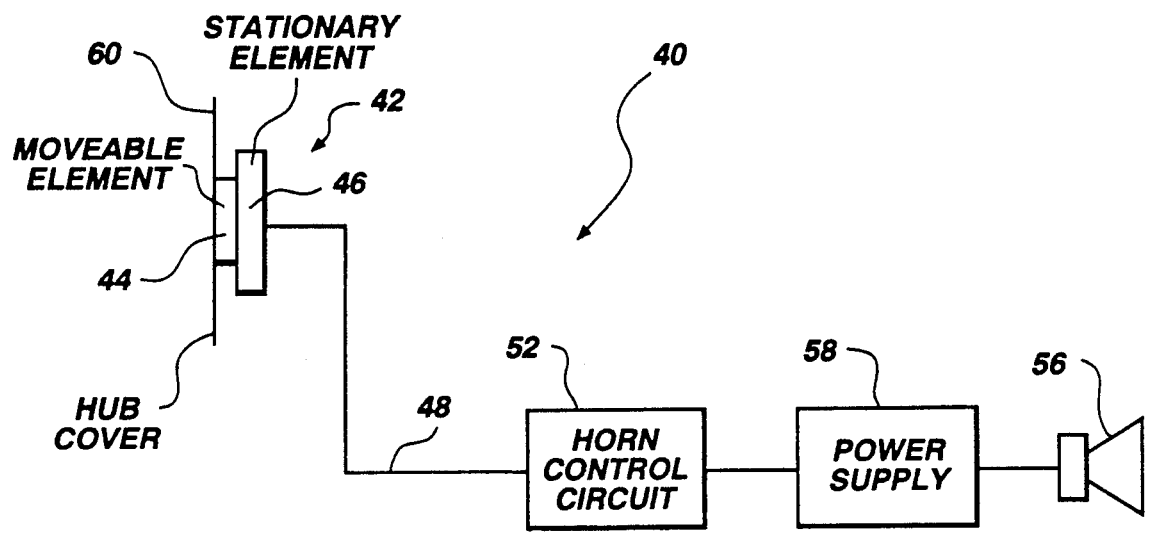
FIG. 3 is a schematic representation of a typical prior art automobile horn control system.
Figure 4A:
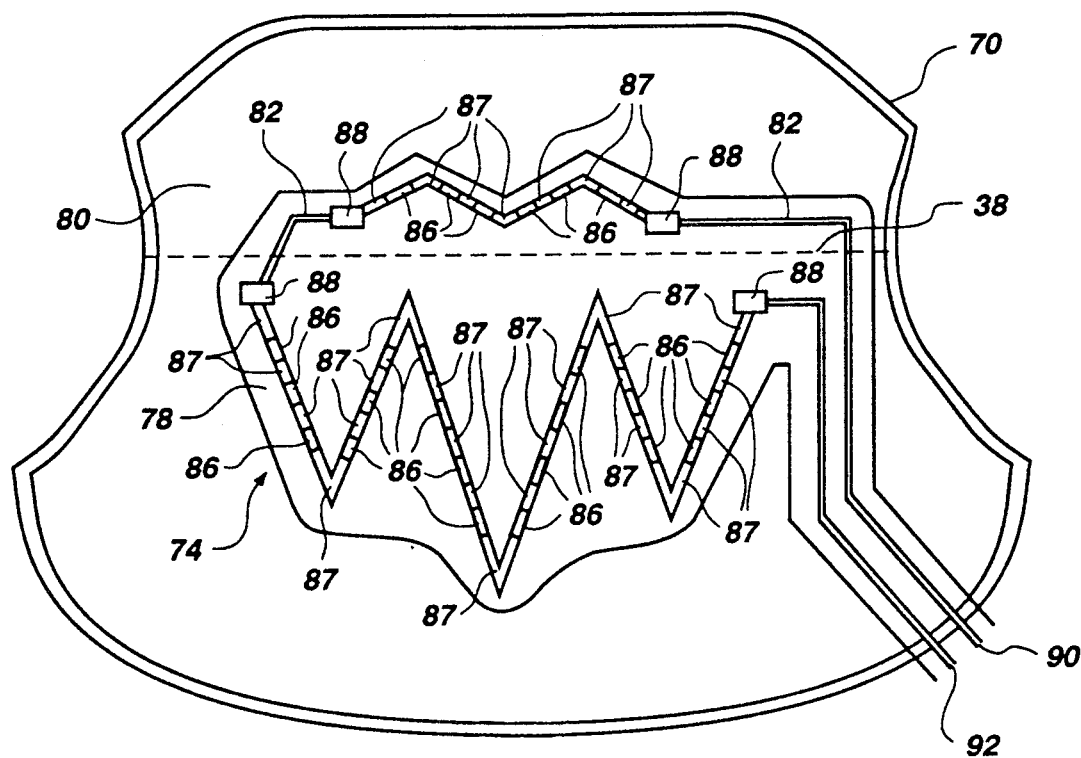
FIG. 4A is an inside view of a flexible potentiometer in a first arrangement according to the present invention adhered to the inside of a steering wheel hub cover.

FIG. 4A shows an inside view of a hub cover 70, which is designed to cover an air bag, similar or identical to the way hub cover 20 covers air bag 12. (FIG. 4A is an inside view in that it is viewed from the steering wheel hub toward the driver.) A flexible potentiometer 74 acts as a horn actuator in a horn control system. Flexible potentiometer 74 includes a flexible substrate 78, which is adhered to inside surface 80 of hub cover 70. As explained below, the resistance of flexible potentiometer 74 changes as it is bent. The term "flexible potentiometer" is used, although it may be termed a bendable variable resistor.

Referring to FIG. 4A, flexible potentiometer 74 includes a variable resistance conductive material 86, such as an ink described below, that is applied to substrate 78. Conductive junction points 88 may be used for convenience in manufacturing and assembling flexible potentiometer 74. A constant resistance conductive material 87 may be applied on top of conductive material 86. The resistance of conductive material 86 changes significantly as conductive material 86 is bent. The resistance of constant resistance conductive material 87 remains relatively constant as constant resistance conductive material 87 is bent. Constant resistance conductive material 87 provides a path for electrical current that is in parallel to the path provided by conductive material 86. Therefore, the overall change in resistance of flexible potentiometer 74 is less if constant resistance conductive material 87 is applied. In this sense, constant resistance conductive material 87 is an attenuator. Applying constant resistance conductive material 87 is an inexpensive way to reduce the resistance in flexible potentiometer 74. Constant resistance conductive material 87 helps to linearize the resistance versus load curve of flexible potentiometer 74. However, even with constant resistance conductive material 87, the resistance versus load curve of flexible potentiometer 74 is still not completely linear.

Figure 4B:
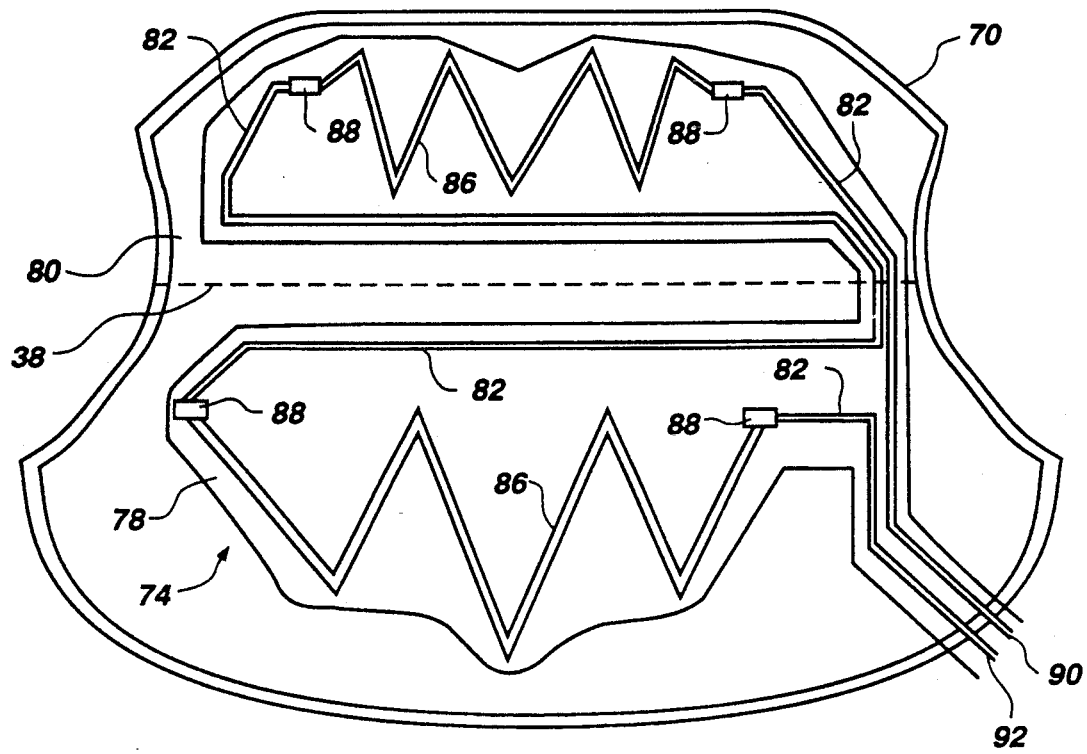
FIG. 4B is an inside view of a flexible potentiometer in a second arrangement according to the present invention adhered to the inside of a steering wheel hub cover.
Figure 4C:
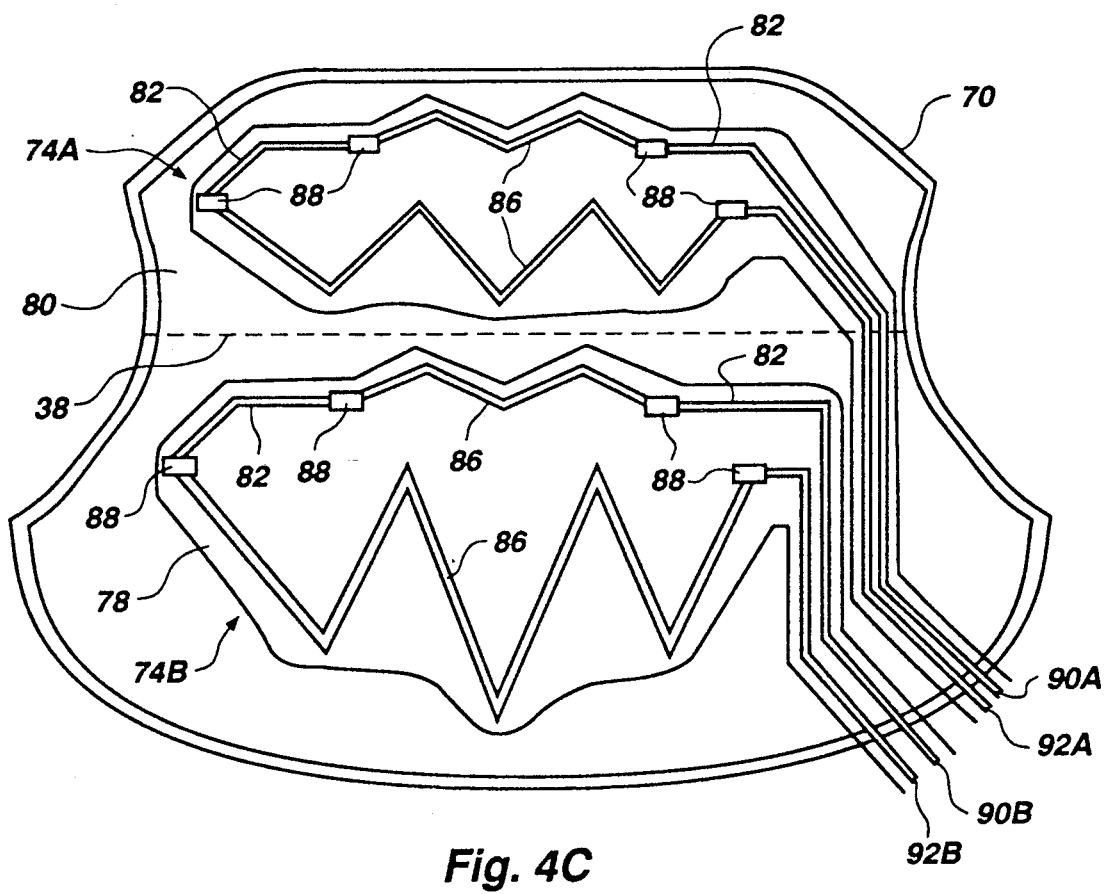
FIG. 4C is an inside view of a flexible potentiometer in a third arrangement according to the present invention adhered to the inside of a steering wheel hub cover.

When flexible potentiometer 74 is used as a simple on-off horn actuator, the extra precision allowed by constant resistance conductive material 87 is probably not necessary. Accordingly, FIGS. 4B and 4C show flexible potentiometer 74 without constant resistance conductive material 87. Moreover, conductive material 86 could be applied directly to inside surface 80. Therefore, flexible potentiometer 74 does not require flexible substrate 78. Flexible potentiometer 74 does, however, require at least conductive material 86 on some substrate.

The shape of conductive material 86 is chosen so that the automobile horn will sound when the driver presses against particular portions of the outside of the hub cover 70. The shapes shown in FIGS. 4A–4C are designed such that the driver may activate the automobile horn by pressing against almost any portion of hub cover 70, except perhaps the edges of hub cover 70. (Hub cover 70 has curved portions that wrap around part of the air bag, perhaps giving the false visual impression that conductive material 86 does not cover as much of the inside of hub cover 70 as it in fact does.)

It is important that dislodged objects do not hit the driver in the face as hub cover 70 splits along line 38 as the airbag is inflated. Accordingly, portions of flexible potentiometer 74 that may break are preferably kept near the edges of hub cover 70 where they are less likely to strike the driver. In FIGS. 4B and 4C, substrate 78 and conductors 82 are present only at one edge of hub cover 70. FIG. 4B shows conductive material 86 above and below line 38 that are joined by conductors 82. FIG. 4C shows conductive material 86 above and below line 38 that are not joined by conductors 82.

Figure 5:
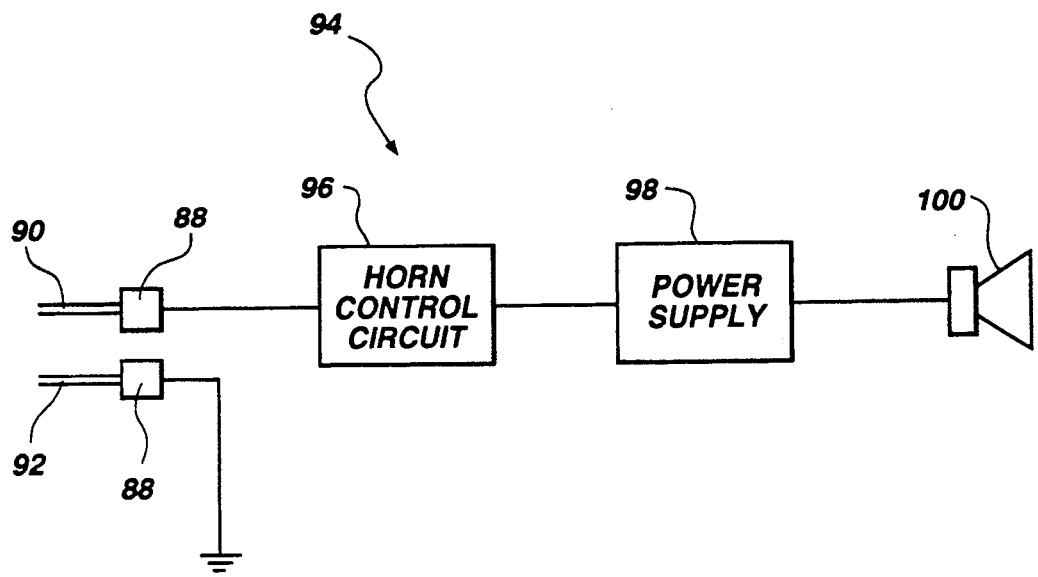
FIG. 5 is a schematic representation of an automobile horn control system that is responsive to a flexible potentiometer of the present invention.

Flexible potentiometer 74 includes leads 90 and 92 (and in the case of FIG. 4C, leads 90A and 92A, and 90B and 92B), and that allow flexible potentiometers 74A and 74B to connect with an automobile horn control system 94, described in connection with FIG. 5. (Horn control system 94 is specifically designed for flexible potentiometer 74 of FIGS. 4A and 4B, although horn control system 94 could be easily modified to accommodate flexible potentiometers 74A and 74B of FIGS. 4C.). Automobile horn control system 94 includes horn control circuit 96, power supply 98 and horn 100. Power supply 98 and horn 100 may be standard, well known automobile parts.

The function of horn control circuit 96 is to activate power supply 98 when the driver presses against particular portions of hub cover 70 with at least a threshold level of force. A preferred horn control circuit 96 has the following characteristics. The resistance of flexible potentiometer 74 may change with changes in temperature. Therefore, a preferred horn control circuit 96 responds to extremely rapid changes in the resistance of flexible potentiometer 74, but not to more gradual changes. As used herein, rapid changes are those roughly on the order of the time required to honk a horn.

The resistance of flexible potentiometer 74 depends on the shape and characteristics of various parameters including hub cover 70, the air bag, flexible substrate 78, and conductive material 86. The shape and characteristics of these parameters vary significantly from one model of car to another. Also, because of tolerances in manufacturing, the shape and characteristics of these parameters vary even with the same design. Because horn control circuit 96 responds to changes in resistance rather than to the absolute resistance of flexible potentiometer 74, at least relatively small (and perhaps large) variations in the shape and characteristics of these parameters will not affect whether horn control circuit 96 properly responds to the driver pressing against hub cover 70 to sound horn 100. A horn control circuit 96 having this feature is said to have a zeroing out function.

Those skilled in the art will appreciate that a variety of circuits may be employed to carry out the above-described functions of horn control circuit 96. Horn control circuit 96 may include a microprocessor, which provides significant flexibility and ease in accommodating a wide variety of parameters.

Figure 6:
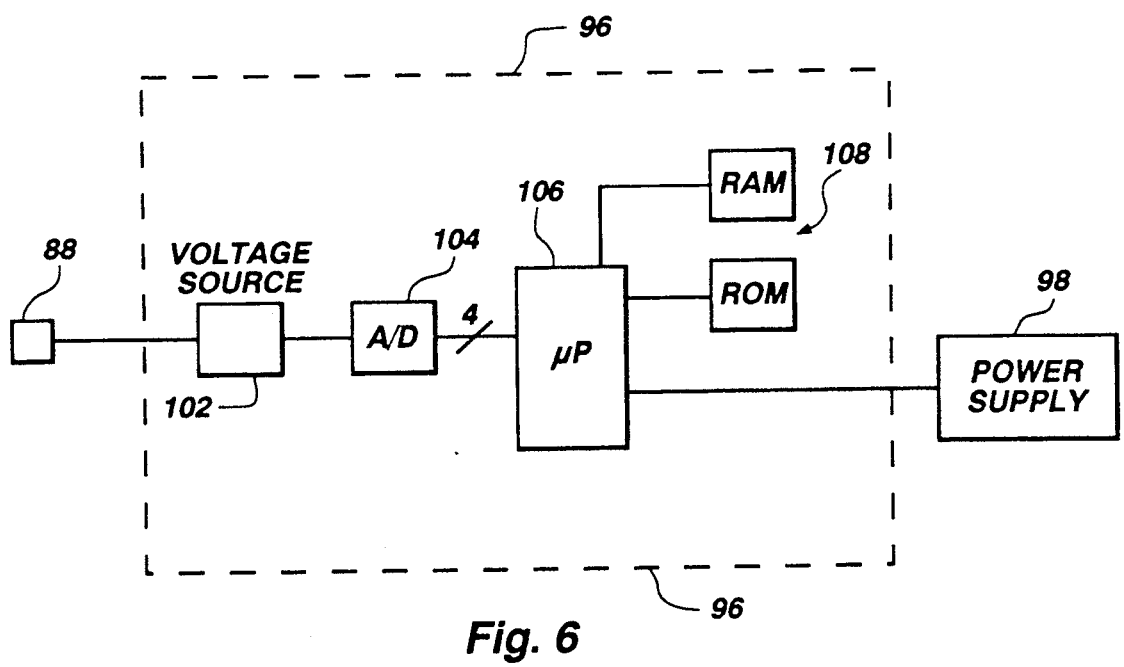
FIG. 6 is a schematic representation of a horn control circuit that employs a microprocessor.

Referring to FIG. 6, horn control circuit 96 includes voltage source 102 that provides a voltage that represents the resistance value in flexible potentiometer 74. Voltage source 102 may employ a voltage divider. An analog-to-digital converter (A-to-D) 104 converts the analog signal provided by voltage source 102 to a digital signal that is read by a microprocessor 106. Microprocessor 106, which employs read only memory (ROM) and random access memory (RAM) 108, preferably responds to rapid changes in resistance rather than to absolute resistance values. Moreover, microprocessor 106 may respond differently depending on the magnitude of the change. For example, microprocessor 106 could cause a power supply to send voltage levels to a horn that are related to the magnitude of the change, above a threshold level.

Disadvantages of a microprocessors include expense. The functions of horn control circuit 96 may be performed by a variety of analog circuits, that will be apparent to those skilled in the art.

Figure 7:
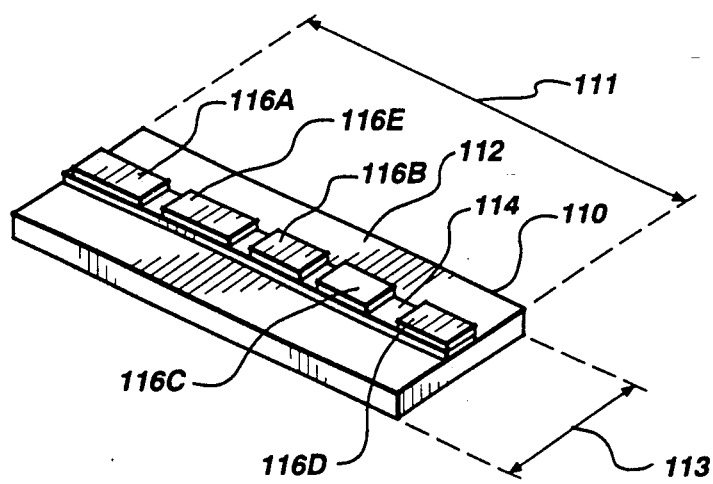
FIG. 7 is an enlarged perspective view of a portion of a flexible potentiometer of the present invention.

FIG. 7 illustrates a portion of a flexible potentiometer 74 of the present invention in perspective and substantially enlarged. Flexible potentiometer 74 includes a substrate 110 (identified as substrate 78 in FIGS. 4A-4C). Substrate 110 is formed of a deflectable electrical insulating material. Various types of polymers, such as polyimide, polycarbonide, or mylar are presently believed to be suitable as substrate 110.

Substrate 110 illustrated in FIG. 7 has a top surface 112 to which a conductive material 114 (identified as conductive material 86 in FIGS. 4A-4C) is here applied in a preselected pattern. For example, in FIG. 9 the pattern is "U" or loop shaped, which may be desirable for actuators of auxiliary components, such as cruise control. However, the precision described in connection with FIG. 9 may be more than is necessary for cruise control. Other shapes may be desired to produce a variety of different electrical outputs upon deflection.

Conductive material 114 of FIG. 7 is formed of an electrically conductive ink which predictably changes electrical resistance upon deflection or bending of substrate 110 between a first configuration and a second configuration. Various types of phenolic resin materials are presently believed to be suitable as conductive material 114. For example, a phenolic resin Formula 3609 manufactured by Electronic Materials Corporation of America, (EMCA-REMEX Products, Ablestik Electronic Materials & Adhesives), 160 Commerce Drive, Montgomeryville, Pa. 18931, has been found suitable in that it is elastically flexible or bendable for many thousands of cycles or bends. Conductive material 114 may also be a two-part epoxy material, a thermoset adhesive, or a thermoplastic, all incorporating conductive material such as graphite or carbon. Conductive material 114 may include a carbon ruthenium. Conductive material 114 may be conductive ink which is adhered to substrate 110. By adhere, it is meant that conductive material 114 is attached to substrate 110 because conductive material 114 includes a material which facilitates wetting, gluing, or sticking. The selected ink may include graphite in combination with a binder. The electrically conductive ink is preferably of the type which is applied to substrate 110 in liquid form and which in turn dries to a solid form. Segmented conductor 116 is of the type which is applied to conductive material 114 in liquid form and which also dries to a solid form. Alternatively, segmented conductor 116 may be a solid which is pressed onto conductive material 114.

The flexible potentiometer of FIG. 7 may include a segmented conductor 116 (identified above as constant resistance conductive material 87), made of silver and adhered to conductive material 114. Segmented conductor 116 is formed of an electrically conductive material in segments 116A, 116B, 116C, 116D and 116E, each spaced from the other along conductive material 114. It is also believed formable from conductive silver alloys, or other conductive metals, as well as conductive carbon-based compounds. Segmented conductor 116 retains its electrical conductivity upon deflection.

As noted hereinbefore, FIG. 7 depicts only a portion of a flexible potentiometer. That is, the length 111 may be longer (or shorter) than shown. The width 113 is greater so that conductive material 114 may be formed into a complete circuit such as the one shown in FIG. 9.

Figure 8:
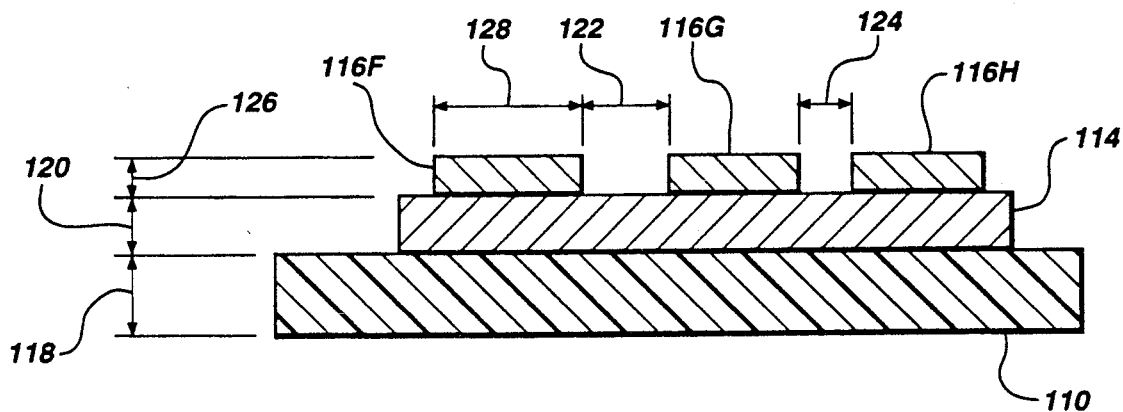
FIG. 8 is substantially enlarged cross-section of a portion of a flexible potentiometer of the present invention.

Referring to FIG. 8, substrate 110 is shown to have a thickness 118 which is here shown substantially disproportionate to the true thickness of substrate 110 solely to facilitate illustration. That is, for substrate 110 to be elastically deflectable, it is preferred that its thickness be from about 0.005 to about 0.010 inches. If it is to be inelastically deflectable, the material and thickness should be appropriately selected.

As illustrated in FIG. 8, conductive material 114 is deposited to adhere to substrate 110 and in turn has a thickness 120 which is here illustrated substantially larger than the actual thickness. That is, the thickness 120 is illustrated disproportionate to the actual thickness of substrate 110 and of the actual layer of conductive material 114. In particular the thickness 120 of conductive material 114 is from about 0.0003 to about 0.001 inches and desirably about 0.0007 inches.

As illustrated in FIG. 8, segmented conductor 116 may be positioned and adhered to conductive material 114. Segmented conductor 116 is comprised of a plurality of segments 116A-E as illustrated in FIG. 7. The segments are each spaced apart a preselected distance 122 and 124 as shown in FIG. 8. Notably, the distances 122 and 124 may be different; or they may be selected to be substantially the same, as desired by the user. The segments are positioned on conductive material 114 to regulate the conductivity and in turn the electrical resistance of conductive material as more specifically discussed hereinafter.

Segmented conductor 116 may have a thickness 126 from about 0.00035 to about 0.00055 inches and preferably about 0.00045 inches. Each segment 116F and 116G has a length 128 selected to regulate the electrical resistivity of flexible potentiometer 74 discussed hereinafter. As noted above, the precision allowed by segmented conductor 116 may be more than is necessary for simple applications.

Figure 9:
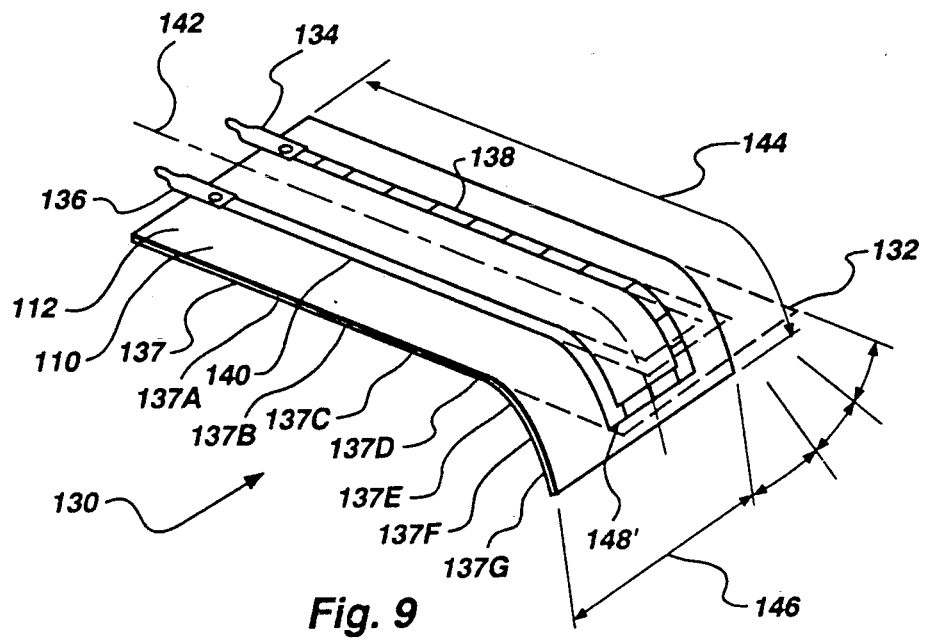
FIG. 9 is a perspective of a representative potentiometer of the present invention.

Referring to FIGS. 8 and 9, substrate 110 is shown with conductive material 114 positioned thereon. That is, conductive material 114 with segmented conductor 116 is positioned on substrate 110 which is deflectable between a first configuration illustrated with solid lines 130 and a second configuration illustrated with dotted lines 132. Simply stated, substrate 110 is bendable or deflectable between the configuration 130 and the configuration 132. Upon deflection between the position or the configuration 130 and the configuration 132, the electrical resistance as measured between connectors 134 and 136 varies consistently and predictably. That is, the variance in electrical resistance is not only predictable or known for the various deflections or configurations, but also the variance is consistent and does not radically or randomly change over the lifetime of the potentiometer. Thus, substrate 110 can be repetitively deflected between the configuration 130 and the configuration 132, and the resistance will thereby consistently and predictably vary to reflect the deflection and the configuration.

Empirically, it has been ascertained that the deflection between the configurations 132 and 130 and all configurations therebetween can be determined so that the precise position of substrate 110 and conductive material 114 as it is deflected between configuration 132 and configuration 130 can be readily ascertained by measurement of the electrical resistance at the connectors 134 and 136 and thereafter by appropriate computations, which can be effected using appropriate computer software as now available from Advantech, Inc., 1333 East 9400 South, Suite 160, Sandy, Utah, 84093, or Abrams & Gentile Entertainment, Inc., 244 West 54th Street, New York, NY 10019. That is, a microprocessor can be connected to the conductors 134 and 136. The microprocessor has software to in turn calculate the deflection of the flexible potentiometer between any two selected configurations. That is, the microprocessor is able to compute the relative positions of certain points 137A-G along the edge 137 of substrate 110 based on the resistance detected at conductors 134 and 136 and thereafter transmit or display that information as desired. Thus, the position or configuration of substrate 110 and the flexible potentiometer is reflected by the resistance.

Figure 10:
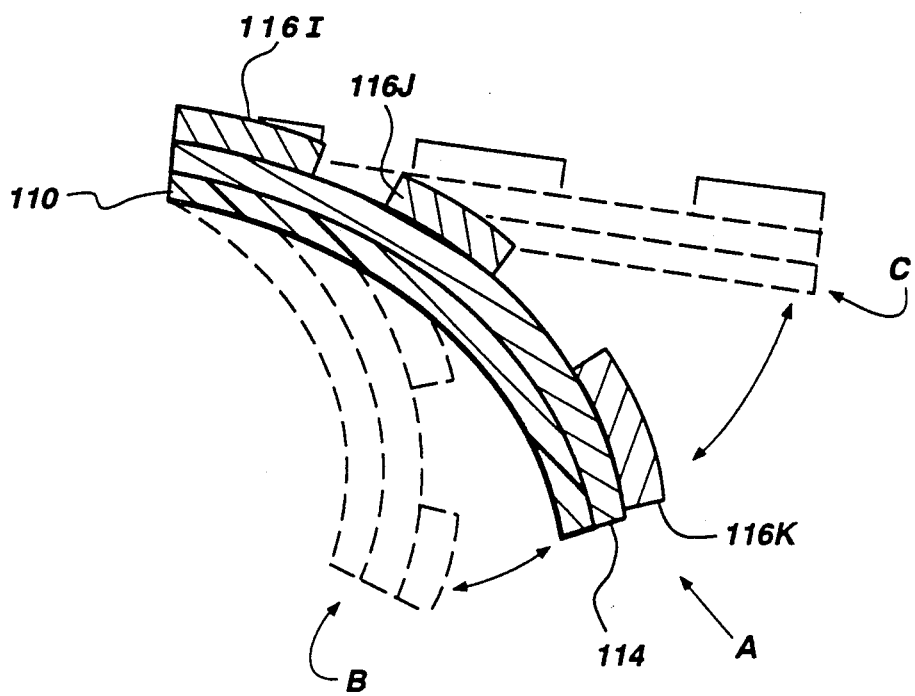
FIG. 10 is an enlarged cross-section of a portion of a flexible potentiometer of the present invention showing two other configurations in phantom.

In FIG. 10, a portion of the flexible potentiometer is shown in a bent configuration A and in a further bent configuration B shown in doted line. It is also shown in a non-deflected configuration C. The electrical resistance of the potentiometer consistently, predictably varies as the potentiometer is bent or deflected incrementally to any configuration between configuration A, B and C as well as other configurations involving greater bending or deflection.

Figure 11:
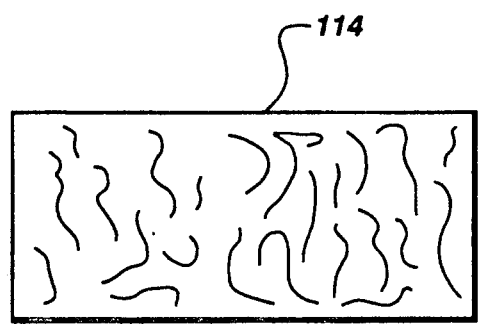
FIG. 11 is a depiction of an envisioned microscopic enlargement of a portion of a flexible potentiometer of the present invention.

As the flexible potentiometer is deflected or bent, it is believed but has not yet been scientifically confirmed that the conductive ink which contains graphite, cracks or deforms as depicted in FIG. 11. That is, the dried conductive material 114 has a granular or crystalline-type structure which cracks or breaks upon deflection. As the conductive ink bends, the number of cracks and the space between them is believed to increase, thereby changing the electrical resistance in a predictable manner. The change can be measured upon application of suitable electrical signals.

Segmented conductor 116 is positioned along conductive material 114 in preselected lengths 128 to control or regulate the resistivity of the deflected conductive material 114 and in turn ensure that upon repetitive deflections, the variation of the resistance between configurations A, B and C is consistent throughout the life of substrate 110 and conductive material 114. More particularly, the length and width of segments 116 as well as the spaces 122 and 124 between the segments is empirically selected to ensure that the resistance is consistently repetitive.

With segmented conductor 116 affixed or adhered to conductive material 114, the resistance may still vary somewhat over time, but the degree of variance is either within acceptable tolerances or otherwise measurable from time to time so that adjustments can be made to accommodate for the drift in resistance over time.

Referring to FIG. 9, it can be seen that the flexible potentiometer here illustrated has a first leg 138 and a second leg 140 both of which are substantially parallel to an axis 142 of substrate 110 which has an overall length 144 as well as a width 146. The first leg 138 and the second leg 140 extend lengthwise and are interconnected by a third leg 148 to form the desired configuration of conductive material 114. Notably, only one leg 138 has a conductive material 114 with a segmented conductor 116 as shown in FIGS. 7 and 8. The other leg 140 has a conductor which does not vary in resistance upon deflection.

It may be noted that the connectors 134 and 136 are slide connectors which are riveted onto substrate 110 or otherwise affixed thereto to electrically interconnect the first leg 138 and the second leg 140 with exterior electrical components such as a microprocessor.

In use, substrate 110 is deflected repetitively and the deflection thereof may be measured by measuring the variance in resistance at the connectors 134 and 136. Thus, the resistance and in turn the movement or deflection of a variety of objects can be measured accurately.

The present invention is not limited to using flexible potentiometer 74 as a horn actuator. Flexible potentiometers may be employed as actuators to control auxiliary electrical components, such as windshield wipers, cruise control, headlights, radios, heaters. In this respect, the flexible potentiometer need not be positioned adjacent to a steering wheel cover or an airbag. Some flexible potentiometers could, for example, be placed on the dashboard.

Figure 12:
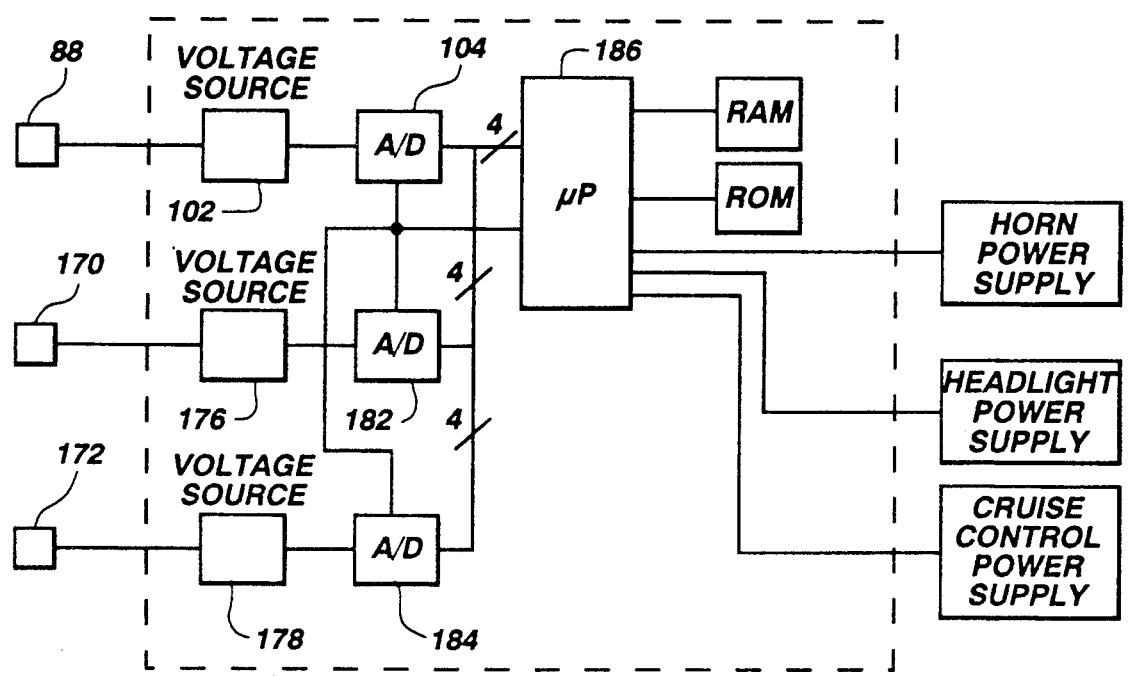
FIG. 12 is a schematic representation of a control circuit that controls multiple functions in the automobile.
Figure 13:
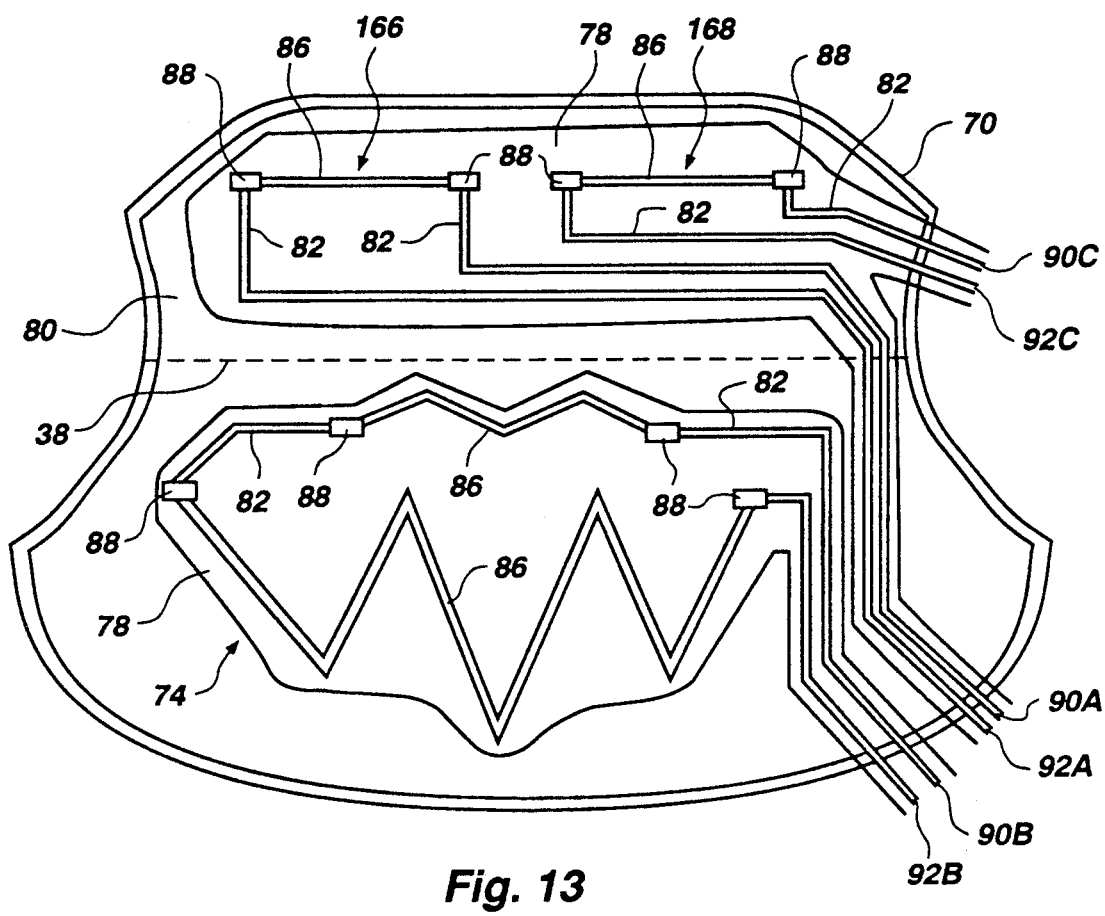
FIG. 13 is an inside view of a multiple flexible potentiometers adhered to the inside of a steering wheel hub cover.

Referring to FIGS. 12 and 13, multiple flexible potentiometers 74, 166, and 168 are used to control multiple devices in an automobile. For example, flexible potentiometer 74 connected to conductive junction point 88 is used as a horn actuator. Flexible potentiometer 166 connected to conductive junction point 170 is used to control headlights. Flexible potentiometer 168 connected to conductive junction point 172 is used to control cruise control. Voltage sources 102, 176, and 178 convert the resistance in the flexible potentiometers to analog voltages which are, in turn, converted to digital voltages by A-to-D converters 104, 182, and 184. The digital voltages from A-to-D converters 104, 182, and 184 may have, for example, four bits, which are read by microprocessor 186, which may be more powerful than microprocessor 106 in FIG. 6. Microprocessor 186 may respond differently to different voltage changes. For example, one voltage change may indicate a low beam headlights condition, while a second voltage change may indicate a high beam head light condition. In the case of the horn, different voltage changes would indicate different desired horn loudnesses. Flexible potentiometer 74 may act as a switch and magnitude combination in which a threshold force turns a function on, but increased force increases the magnitude.

A flexible potentiometer may be used as an actuator for a horn control system in an automobile without an airbag. In an automobile with an airbag, a flexible potentiometer used as an actuator for a horn control sysstem does not need to be placed adjacent to the airbag.

Flexible potentiometer 74 is preferably adhered to inside surface 80 of hub cover 70 in a mechanical nonadhesive technique such as heat stake, ultra-sonic bonding or molding technique. Alternatively, flexible potentiometer 74 could be embedded within the rubber of hub cover 70 or on the outside of hub cover 70. Conductive material 86 could be placed directly onto inside surface 80, but for ease it is placed onto flexible substrate 78. Flexible potentiometer 74 could be placed on another surface such as a molded substrate. Conductive material 86 could be molded into plastic.

Flexible potentiometer 74 may be placed any where there is movement. For example, flexible potentiometer 74 could be placed behind the airbag (i.e., so the airbag was between the driver and flexible potentiometer 74) if the entire section moved. In any of the above-described arrangements, flexible potentiometer 74 is operationally connected to hub cover 70 if pressing against a portion of hub cover 70 causes bending in flexible potentiometer 74.

Flexible potentiometer may be used to measure inelastic deformation so that substrate 110 itself is inelastically deformable. Substrate 110 should be deflectable without causing an electrical discontinuity or open circuit in conductive material 86 while generally maintaining its electrical insulating characteristics. In such cases, appropriate material should be employed, which may be different from the ones described above.

Those skilled in the art will appreciate that many changes may be made to the above-described illustrated embodiments without departing from the spirit of the invention. Therefore, the details of the embodiments or alternatives are not intended to limit the scope of the following claims.

What is claimed is:

1. A flexible potentiometer horn actuator for use in an automobile horn control system of an automobile having an airbag between a steering wheel hub and a hub cover, the automobile including a horn control circuit that selectively activates a horn upon receiving an input signal, the flexible potentiometer horn actuator comprising:
   a conductor connected to the horn control circuit;
   a flexible substrate adhered to the hub cover;
   a conductive material connected to the conductor and adhered to the flexible substrate in a preselected pattern, the conductive material having a resistance that changes as the conductive material is bent, whereby as a driver presses against the hub cover, the flexible substrate and conductive material are bent changing the resistance of the conductive material and creating the input signal.

2. The actuator of claim 1 in which the conductive material is divided into portions that are separated by conductors.

3. The actuator of claim 1 in the resistance changes due to cracking in the conductive material.

4. An automobile electrical component actuator system for use in an automobile having an airbag between a steering wheel hub and a hub cover, the automobile including a horn control circuit that selectively activates a horn upon receiving an first input signal, and an auxiliary control circuit that activates an auxiliary electrical component of the automobile upon receiving a second input signal, the component actuator system comprising:
   a first conductor connectable to the horn control circuit;
   a first conductive material in a preselected pattern operationally connected to the hub cover, the first conductive material connected to the first conductor, the first conductive material having a resistance that changes as the first conductive material is bent, whereby as a driver presses against the hub cover, the first conductive material is bent changing the resistance of the first conductive material and creating the input signal;
   a second conductor connectable to the auxiliary electrical component; and
   a second conductive material in a preselected pattern operationally connected to the hub cover, the second conductive material connected to the second conductor, the second conductive material having a resistance that changes as the second conductive material is bent, whereby as a driver presses against the hub cover, the second conductive material is bent changing the resistance of the second conductive material and creating the second input signal.

5. A flexible potentiometer horn actuator for use in an automobile horn control system of an automobile having an airbag between a steering wheel hub and a hub cover, the automobile including a horn control circuit that selectively activates a horn upon receiving an input signal, the flexible potentiometer horn actuator comprising:
   a conductor connectable to the horn control circuit; and
   a conductive material having a preselected pattern operationally connected to the hub cover, the conductive material connected to the conductor, the conductive material having a resistance that changes as the conductive material is bent, whereby as a driver presses against the hub cover, the conductive material is bent changing the resistance of the conductive material and creating the input signal in the conductor when the conductor is connected to the horn control circuit.

* * * * *